US012449746B2

(12) United States Patent
Sato

(10) Patent No.: US 12,449,746 B2
(45) Date of Patent: Oct. 21, 2025

(54) TONER CARTRIDGE

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 20 days.

(21) Appl. No.: 18/532,129

(22) Filed: Dec. 7, 2023

(65) Prior Publication Data

US 2024/0241465 A1 Jul. 18, 2024

(30) Foreign Application Priority Data

Jan. 13, 2023 (JP) ................................ 2023-003970

(51) Int. Cl.
*G03G 15/08* (2006.01)

(52) U.S. Cl.
CPC ..... *G03G 15/0872* (2013.01); *G03G 15/0886* (2013.01); *G03G 15/0889* (2013.01); *G03G 2215/0675* (2013.01); *G03G 2215/0692* (2013.01); *G03G 2215/0819* (2013.01)

(58) Field of Classification Search
CPC ........... G03G 15/0886; G03G 21/1817; G03G 21/1821; G03G 2215/0692; G03G 15/0867; G03G 21/1814; G03G 21/1676
See application file for complete search history.

(56) References Cited

U.S. PATENT DOCUMENTS 5,737,668 A * 4/1998 Johroku ............ G03G 15/0868 399/120
6,304,739 B1 * 10/2001 Katsuyama ........ G03G 15/0874 399/119
6,418,284 B1 * 7/2002 Mercer ............. G03G 21/1821 399/120

FOREIGN PATENT DOCUMENTS

JP 2016-206544 A 12/2016

* cited by examiner

*Primary Examiner* — Jessica L Eley
(74) *Attorney, Agent, or Firm* — Merchant & Gould P.C.

(57) ABSTRACT

A toner cartridge includes a housing configured to contain toner. The housing includes a main body, a first side plate, and a second side plate. The main body has a tubular shape extending in a first direction. The main body is made of paper. The first side plate is located at one end of the main body in the first direction. The first side plate is made of resin. The second side plate located at an other end of the main body in the first direction. The second side plate is made of resin. The main body includes a peripheral surface having a discharge opening. The discharge opening is configured to discharge toner in the housing.

15 Claims, 14 Drawing Sheets

3 / 14

TONER CARTRIDGE

REFERENCE TO RELATED APPLICATIONS

This application claims priority from Japanese Patent Application No. 2023-003970 filed on Jan. 13, 2023. The entire content of the priority application is incorporated herein by reference.

BACKGROUND ART

A toner cartridge configured to contain toner and to be attachable to an image forming unit is known. The image forming unit includes a photosensitive drum and a development roller configured to supply toner to the photosensitive drum.

SUMMARY

A toner cartridge includes resin parts. When the toner cartridge is disposed of, the resin used in the toner cartridge may increase an environmental load.

In view of the foregoing, an example of an object of this disclosure is to provide a toner cartridge configured to reduce an environmental load.

According to one aspect, this specification discloses a toner cartridge. The toner cartridge includes a housing configured to contain toner. Thus, the toner cartridge contains toner. The housing includes a main body, a first side plate, and a second side plate. The main body has a tubular shape extending in a first direction. The main body is made of paper. The first side plate is located at one end of the main body in the first direction. The first side plate is made of resin. The second side plate located at an other end of the main body in the first direction. The second side plate is made of resin. Thus, the toner cartridge includes a paper portion and a resin portion. The main body includes a peripheral surface having a discharge opening. The discharge opening is configured to discharge toner in the housing. Thus, the toner cartridge discharges toner in the housing.

According to another aspect, this specification also discloses a toner cartridge. The toner cartridge includes a housing and an agitator. The housing is configured to contain toner. The housing has a discharge opening configured to discharge toner. Thus, the toner cartridge contains toner and discharges toner. The agitator is located in the housing. The agitator is rotatable about an axis extending in a first direction to agitate toner in the housing. Thus, the toner cartridge agitates toner in the housing. The housing includes a main body, a first side plate, and a second side plate. The main body has a tubular shape extending in the first direction. The main body is made of paper. The first side plate is located at one end of the main body in the first direction. The first side plate is made of resin. The second side plate is located at an other end of the main body in the first direction. The second side plate is made of resin. Thus, the toner cartridge includes a paper portion and a resin portion. The first side plate supports one end of the agitator in the first direction. The second side plate supports an other end of the agitator in the first direction. Thus, the toner cartridge supports both ends of the agitator in the first direction.

According to the toner cartridge of the present disclosure, the environmental load is reduced.

DESCRIPTION

1. Toner Cartridge 1

A toner cartridge 1 will be described with reference to FIGS. 1 to 7. The toner cartridge 1 is attachable to and detachable from a process cartridge 10 (see FIG. 8). The process cartridge 10 will be described later.

Figure 1:
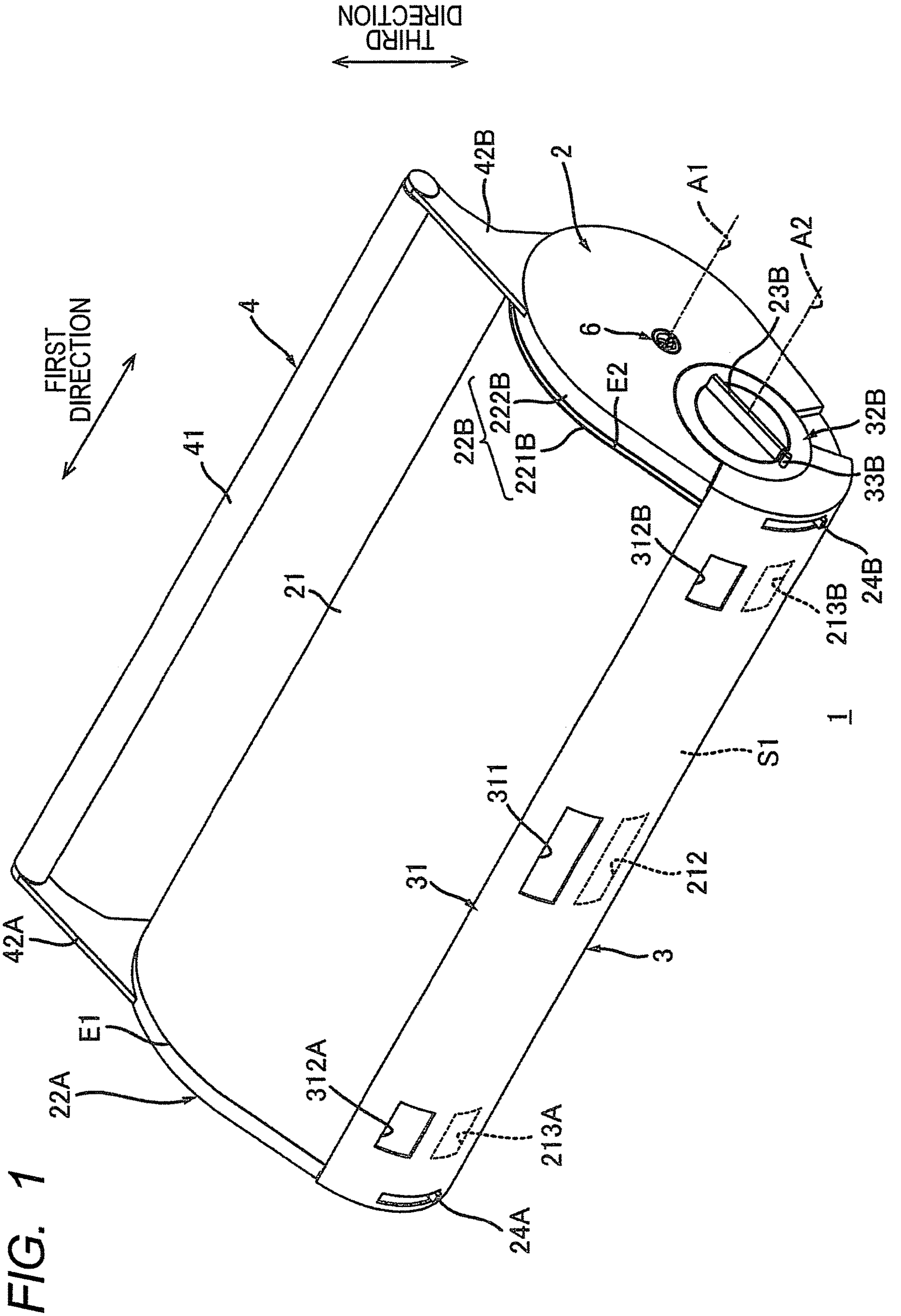
FIG. 1 is a perspective view of a toner cartridge.
Figure 2:
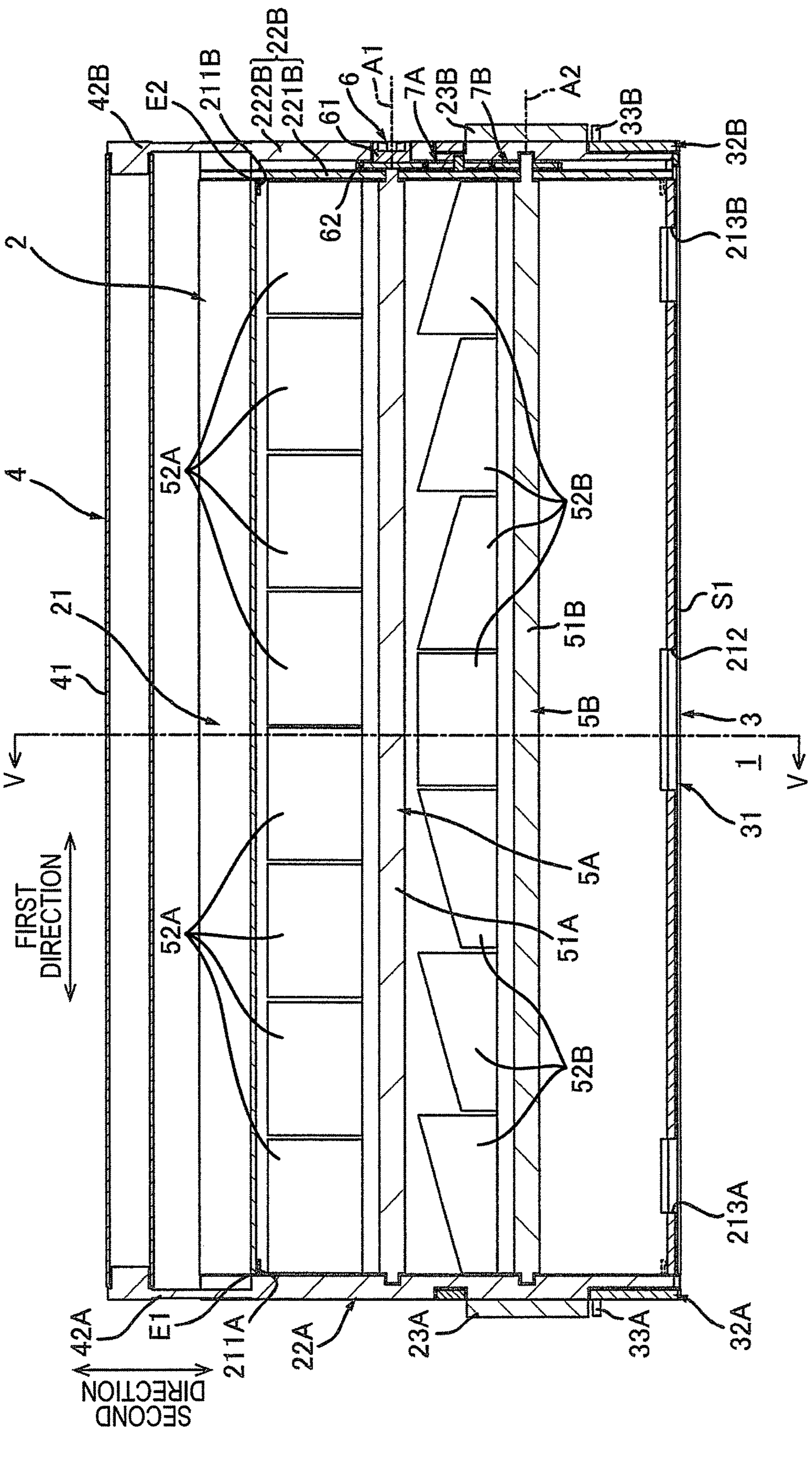
FIG. 2 is a cross-sectional view of the toner cartridge shown in FIG. 1, taken along a line II-II in FIG. 5.
Figure 3:
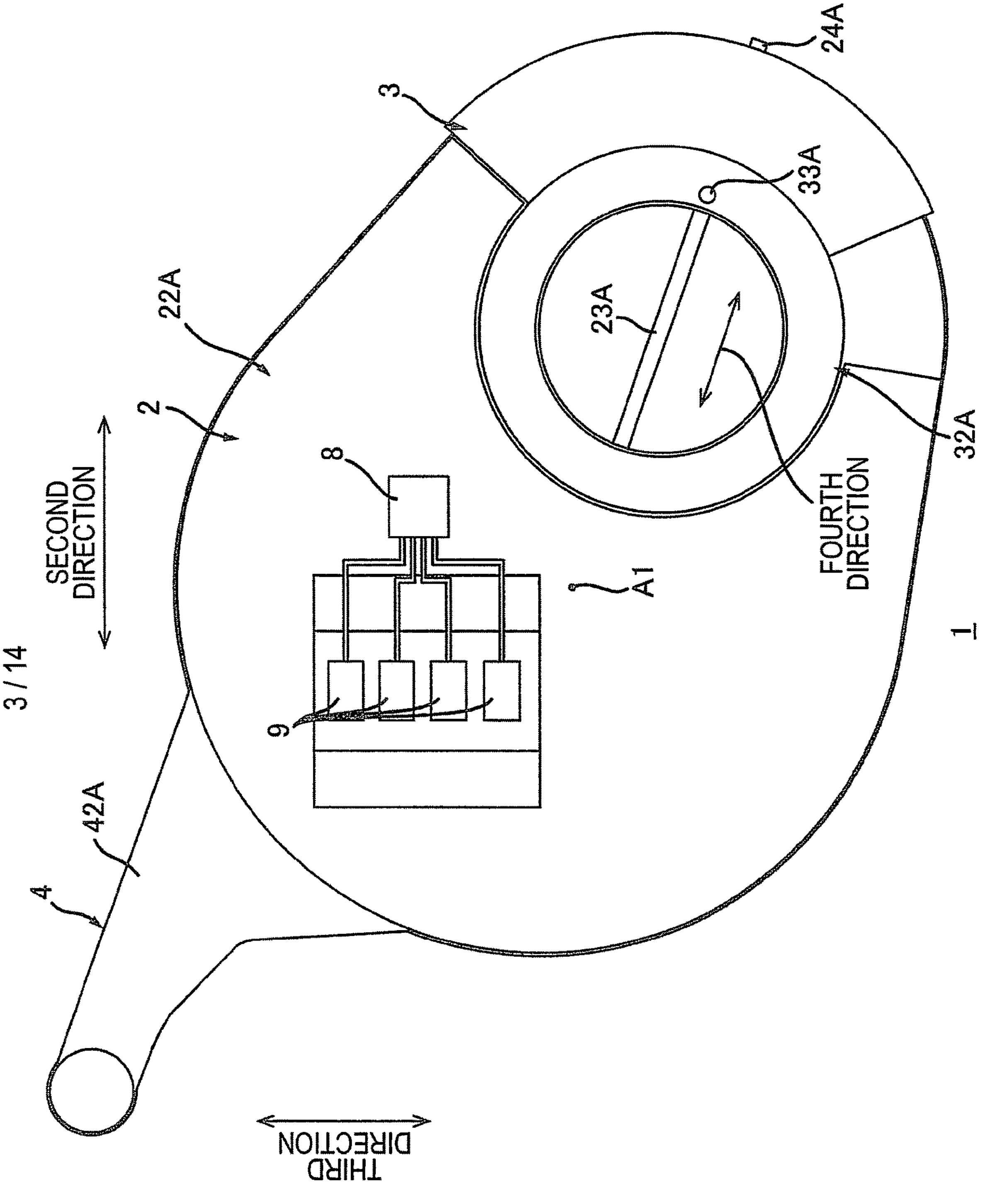
FIG. 3 is a side view of the toner cartridge shown in FIG. 1, as viewed from one side in a first direction.

As shown in FIGS. 1 to 3, the toner cartridge 1 includes a housing 2, a shutter 3, a handle 4, a plurality of agitators 5A and 5B (see FIG. 2), a coupling 6 (see FIG. 2), a plurality of gears 7A and 7B (see FIG. 2), a storage medium 8 (see FIG. 3), and a plurality of electrical contact surfaces 9 (see FIG. 3).

1.1 Housing 2

As shown in FIG. 1, the housing 2 extends in a first direction. The housing 2 is configured to contain toner. The housing 2 has a cylindrical shape. The housing 2 includes a main body 21, a first side plate 22A, a second side plate 22B, two ribs 23A (see FIG. 2) and 23B, and two engagement portions 24A and 24B.

1.1.1 Main Body 21

The main body 21 is located between the first side plate 22A and the second side plate 22B in the first direction. The main body 21 extends in the first direction. The entirety of the main body 21 is formed of a paper-made cylinder. The main body 21 has one end E1 and an other end E2 in the first direction. The other end E2 is located away from the one end E1 in the first direction.

As shown in FIG. 2, in the present embodiment, the one end E1 of the main body 21 in the first direction has a first opening 211A, and the other end E2 of the main body 21 in the first direction has a second opening 211B. That is, the main body 21 has a tubular shape with both ends in the first direction opened. Thus, the main body 21 is easily manufactured.

The main body 21 includes a discharge opening 212 and two return toner reception openings 213A and 213B.

The discharge opening 212 is configured to discharge the toner in the housing 2. The discharge opening 212 is located at a central portion of the main body 21 in the first direction. The discharge opening 212 is located at one end of the main body 21 in a second direction. The second direction crosses the first direction. For example, the second direction is perpendicular to the first direction. For example, the second direction is a horizontal direction in a state where the toner cartridge 1 is attached to the process cartridge 10 (see FIG. 8), the process cartridge 10 is attached to an image forming apparatus 100 (see FIG. 13), and the image forming apparatus 100 is placed on a horizontal plane. The image forming apparatus 100 will be described later. The discharge opening 212 is located at a peripheral surface (circumferential surface) S1 on one side of the main body 21 in the second direction. The peripheral surface S1 has an arc shape.

The return toner reception opening 213A is configured to receive return toner that returns to the toner cartridge 1 from a development housing 131 (see FIG. 12) through a second passage opening 159B (see FIG. 10) of the process cartridge 10 in a state where the toner cartridge 1 is attached to the process cartridge 10. The development housing 131 and the second passage opening 159B will be described later. The return toner reception opening 213A is located away from the discharge opening 212 in the first direction. The return toner reception opening 213A is located between the one end E1 of the main body 21 and the discharge opening 212 in the first direction. The return toner reception opening 213A is located at one end of the main body 21 in the second direction. The return toner reception opening 213A is located at the peripheral surface S1 on one side of the main body 21 in the second direction.

The return toner reception opening 213B is configured to receive return toner that returns to the toner cartridge 1 from the development housing 131 (see FIG. 12) through a second passage opening 159C (see FIG. 10) of the process cartridge 10 in a state where the toner cartridge 1 is attached to the process cartridge 10. The second passage opening 159C will be described later. The return toner reception opening 213B is located on the opposite side of the return toner reception opening 213A with respect to the discharge opening 212 in the first direction. The return toner reception opening 213B is located away from the discharge opening 212 in the first direction. The return toner reception opening 213B is located between the other end E2 of the main body 21 and the discharge opening 212 in the first direction. The return toner reception opening 213B is located at one end of the main body 21 in the second direction. The return toner reception opening 213B is located at the peripheral surface S1 on one side of the main body 21 in the second direction.

1.1.2 First Side Plate 22A

The first side plate 22A is located at one end of the toner cartridge 1 in the first direction. The first side plate 22A is located at the one end E1 of the main body 21 in the first direction. The first side plate 22A closes the first opening 211A of the main body 21. The first side plate 22A supports one end of the agitator 5A in the first direction and one end of the agitator 5B in the first direction. The first side plate 22A extends in a direction crossing the first direction. For example, the first side plate 22A extends in a direction perpendicular to the first direction. As shown in FIG. 3, the first side plate 22A extends in the second direction and a third direction. The third direction crosses the first direction and the second direction. For example, the third direction is perpendicular to the first direction and the second direction. For example, the third direction is a vertical direction in a state where the toner cartridge 1 is attached to the process cartridge 10 (see FIG. 8), the process cartridge 10 is attached to the image forming apparatus 100 (see FIG. 13), and the image forming apparatus 100 is placed on a horizontal plane. The entirety of the first side plate 22A is made of resin.

1.1.3 Second Side Plate 22B

Figure 4:
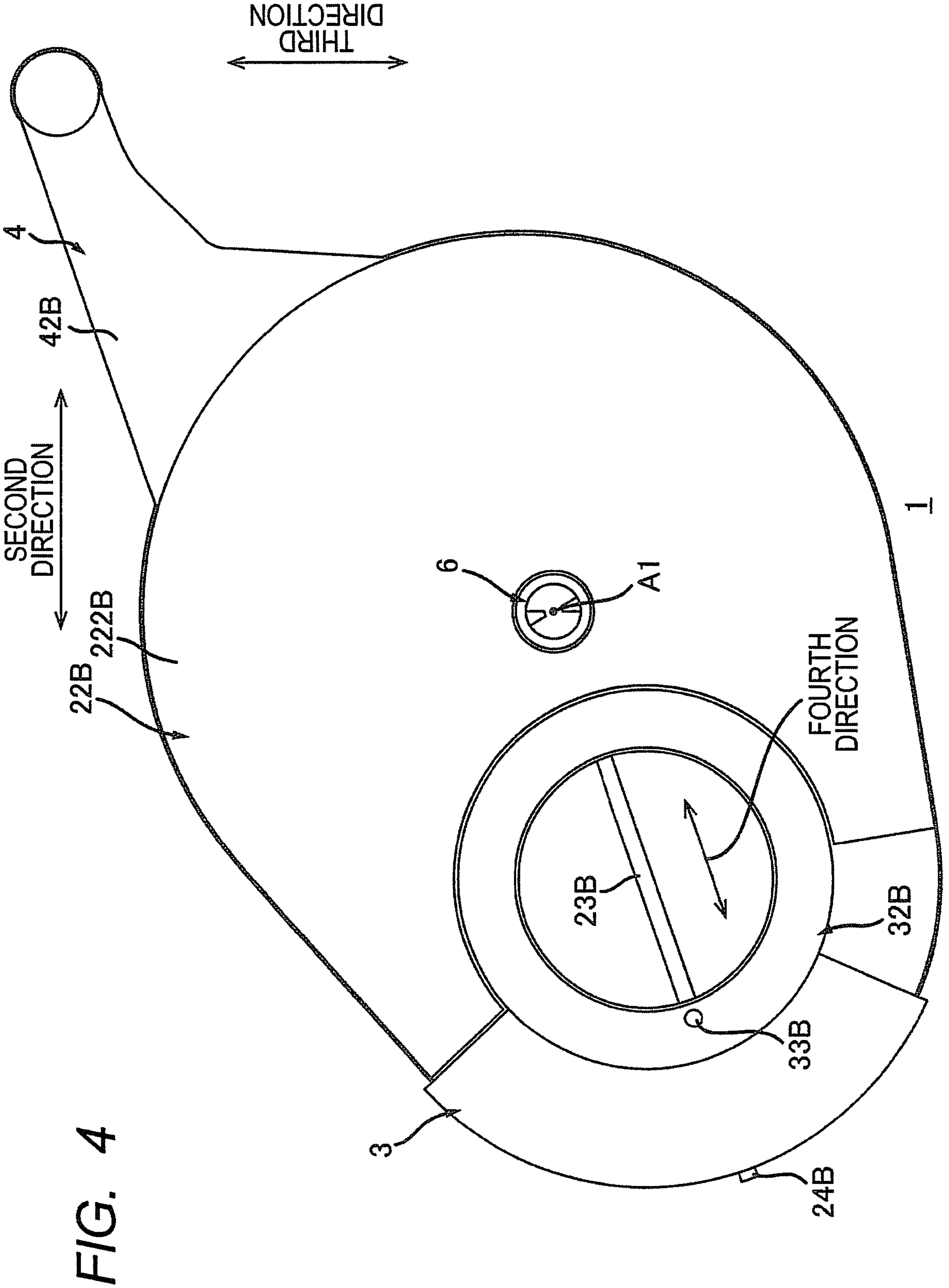
FIG. 4 is a side view of the toner cartridge shown in FIG. 1, as viewed from the other side in the first direction.

As shown in FIG. 2, the second side plate 22B is located at the other end of the toner cartridge 1 in the first direction. The second side plate 22B is located on the opposite side of the first side plate 22A with respect to the main body 21 in the first direction. The second side plate 22B is located away from the first side plate 22A in the first direction. The second side plate 22B is located at the other end E2 of the main body 21 in the first direction. The second side plate 22B closes the second opening 211B of the main body 21. The second side plate 22B extends in a direction crossing the first direction. For example, the second side plate 22B extends in a direction perpendicular to the first direction. As shown in FIG. 4, the second side plate 22B extends in the second direction and the third direction. The entirety of the second side plate 22B is made of resin.

Specifically, as shown in FIG. 2, the second side plate 22B includes a support side plate 221B and a cover 222B. In the present embodiment, the second side plate 22B is formed by the support side plate 221B and the cover 222B.

The support side plate 221B supports the other end of the agitator 5A in the first direction, the other end of the agitator 5B in the first direction, and the gear 7A. In other words, the second side plate 22B supports the other end of the agitator 5A in the first direction. The support side plate 221B is located at the other end E2 of the main body 21 in the first direction. The support side plate 221B closes the second opening 211B of the main body 21. The support side plate 221B extends in a direction crossing the first direction. For example, the support side plate 221B extends in a direction perpendicular to the first direction. The support side plate 221B extends in the second direction and the third direction. The entirety of the support side plate 221B is made of resin.

The cover 222B is located on the opposite side of the main body 21 with respect to the support side plate 221B in the first direction. The cover 222B covers a part of the coupling 6, the gears 7A and 7B. The cover 222B extends in a direction crossing the first direction. For example, the cover 222B extends in a direction perpendicular to the first direction. As shown in FIG. 4, the cover 222B extends in the second direction and the third direction. The entirety of the cover 222B is made of resin.

1.1.4 Ribs 23A and 23B

As shown in FIG. 2, the rib 23A is located on the opposite side of the second side plate 22B with respect to the first side plate 22A in the first direction. The rib 23A protrudes from the first side plate 22A in the first direction. As shown in FIG. 3, the rib 23A extends in a fourth direction. The fourth direction crosses the first direction, the second direction, and the third direction. For example, the fourth direction is perpendicular to the first direction and crosses the second direction and the third direction. The rib 23A is located between an axis A1 and the discharge opening 212 (see FIG. 1) in the fourth direction. The axis A1 will be described later. The entirety of the rib 23A is made of resin. For example, the rib 23A is made of the same resin as the first side plate 22A.

As shown in FIG. 2, the rib 23B is located on the opposite side of the first side plate 22A with respect to the second side plate 22B in the first direction. The rib 23B protrudes in the first direction from the cover 222B of the second side plate 22B. As shown in FIG. 4, the rib 23B extends in the fourth direction. The rib 23B is located between the axis A1 and the discharge opening 212 (see FIG. 1) in the fourth direction. The rib 23B is located between the coupling 6 and the discharge opening 212 (see FIG. 1) in the fourth direction. The entirety of the rib 23B is made of resin. For example, the rib 23B is made of the same resin as the cover 222B of the second side plate 22B.

1.1.5 Engagement portions 24A and 24B

As shown in FIG. 1, the engagement portion 24A is located at one end of the toner cartridge 1 in the first direction. The engagement portion 24A is located on the opposite side of the discharge opening 212 with respect to the return toner reception opening 213A in the first direction. As shown in FIG. 3, the engagement portion 24A is located at one end of the toner cartridge 1 in the second direction. The engagement portion 24A is a protrusion. The engagement portion 24A protrudes from one end of the first side plate 22A in the second direction. In other words, the first side plate 22A includes the engagement portion 24A. The engagement portion 24A extends in the fourth direction. The engagement portion 24A is arranged at an interval from the rib 23A in the fourth direction. The entirety of the engagement portion 24A is made of resin. For example, the engagement portion 24A is made of the same resin as the first side plate 22A.

As shown in FIG. 1, the engagement portion 24B is located at the other end of the toner cartridge 1 in the first direction. The engagement portion 24B is located on the opposite side of the discharge opening 212 with respect to the return toner reception opening 213B in the first direction. The engagement portion 24B is located on the opposite side of the engagement portion 24A with respect to the discharge opening 212 in the first direction. As shown in FIG. 4, the engagement portion 24B is located at one end of the toner cartridge 1 in the second direction. The engagement portion 24B is a protrusion. The engagement portion 24B protrudes from one end of the cover 222B of the second side plate 22B in the second direction. In other words, the second side plate 22B includes the engagement portion 24B. The engagement portion 24B extends in the fourth direction. The engagement portion 24B is arranged at an interval from the rib 23B in the fourth direction. The entirety of the engagement portion 24B is made of resin. For example, the engagement portion 24B is made of the same resin as the cover 222B of the second side plate 22B.

1.2 Shutter 3

Figure 5:
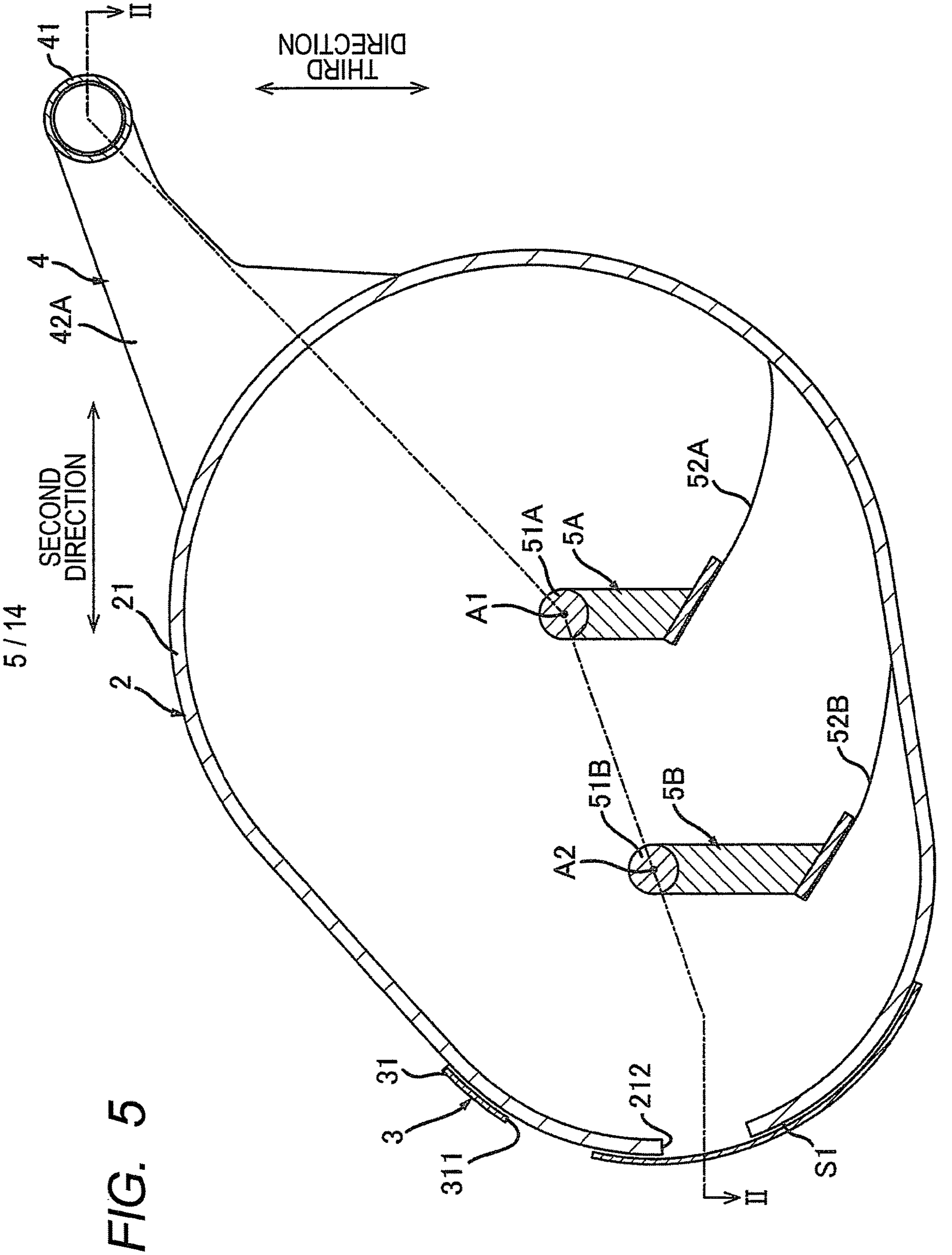
FIG. 5 is a cross-sectional view of the toner cartridge, taken along a line V-V in FIG. 2.
Figure 6:
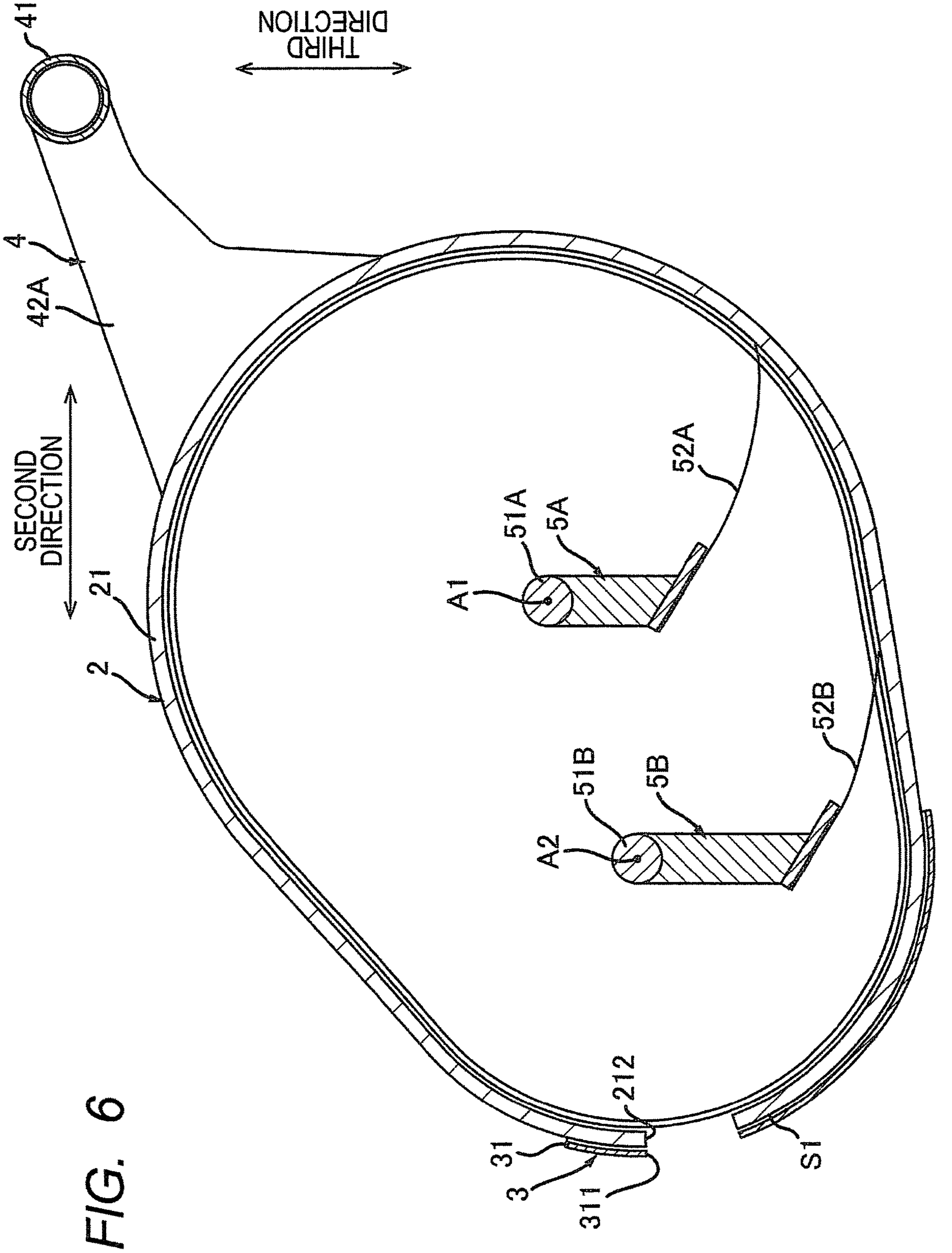
FIG. 6 shows a state where a shutter shown in FIG. 5 is located at an open position.

As shown in FIGS. 5 and 6, the shutter 3 is configured to open and close the discharge opening 212. The shutter 3 is movable between a closed position (see FIG. 5) and an open position (see FIG. 6). The shutter 3 is rotatable about an axis A2 between the closed position and the open position. The axis A2 extends in the first direction. The axis A2 is located away from the axis A1 in the second direction. The axis A2 is located between the discharge opening 212 and the axis A1 in the second direction. As shown in FIG. 5, the shutter 3 closes the discharge opening 212 in a state where the shutter 3 is located at the closed position. As shown in FIG. 6, the discharge opening 212 is opened in a state where the shutter 3 is located at the open position.

Specifically, as shown in FIGS. 1 and 2, the shutter 3 extends in the first direction. The entirety of the shutter 3 is made of resin. The shutter 3 includes a shutter main body 31, two shutter side plates 32A (see FIG. 2) and 32B, and two protrusions 33A (see FIG. 2) and 33B.

1.2.1 Shutter Main Body 31

As shown in FIG. 1, the shutter main body 31 extends in the first direction. The shutter main body 31 is formed along the peripheral surface S1 of the main body 21 of the housing 2. The shutter main body 31 has an arc shape. The shutter main body 31 has a shutter opening 311 and two shutter openings 312A and 312B.

The shutter opening 311 is located at a central portion of the shutter main body 31 in the first direction. As shown in FIG. 5, in a state where the shutter 3 is located at the closed position, the shutter opening 311 is located away from the discharge opening 212. Thus, in a state where the shutter 3 is located at the closed position, the shutter 3 closes the discharge opening 212. As shown in FIG. 6, in a state where the shutter 3 is located at the open position, at least part of the shutter opening 311 communicates with the discharge opening 212. Thus, in a state where the shutter 3 is located at the open position, the discharge opening 212 is opened.

As shown in FIG. 1, the shutter opening 312A is located between the shutter opening 311 and the shutter side plate 32A (see FIG. 2) in the first direction. The shutter opening 312A is located away from the shutter opening 311 in the first direction. In a state where the shutter 3 is located at the closed position (see FIG. 5), the shutter opening 312A is located away from the return toner reception opening 213A. Thus, in a state where the shutter 3 is located at the closed position, the shutter 3 closes the return toner reception opening 213A. In a state where the shutter 3 is located at the open position (see FIG. 6), at least part of the shutter opening 312A communicates with the return toner reception opening 213A. Thus, in a state where the shutter 3 is located at the open position, the return toner reception opening 213A is opened.

The shutter opening 312B is located between the shutter opening 311 and the shutter side plate 32B in the first direction. The shutter opening 312B is located away from the shutter opening 311 in the first direction. The shutter opening 312B is located on the opposite side of the shutter opening 312A with respect to the shutter opening 311 in the first direction. In a state where the shutter 3 is located at the closed position (see FIG. 5), the shutter opening 312B is located away from the return toner reception opening 213B. Thus, in a state where the shutter 3 is located at the closed position, the shutter 3 closes the return toner reception opening 213B. In a state where the shutter 3 is located at the open position (see FIG. 6), at least part of the shutter opening 312B communicates with the return toner reception opening 213B. Thus, in a state where the shutter 3 is located at the open position, the return toner reception opening 213B is opened.

1.2.2 Shutter Side Plates 32A and 32B

As shown in FIG. 2, the shutter side plate 32A is located at one end of the shutter 3 in the first direction. The shutter side plate 32A extends from one end of the shutter main body 31 in the first direction. The shutter side plate 32A extends in a direction crossing the first direction. For example, the shutter side plate 32A extends in a direction perpendicular to the first direction. The shutter side plate 32A is supported by the first side plate 22A. That is, the first side plate 22A supports the shutter 3.

The shutter side plate 32B is located at the other end of the shutter 3 in the first direction. The shutter side plate 32B extends from the other end of the shutter main body 31 in the first direction. The shutter side plate 32B extends in a direction crossing the first direction. For example, the shutter side plate 32B extends in a direction perpendicular to the first direction. The shutter side plate 32B is supported by the cover 222B of the second side plate 22B. That is, the second side plate 22B supports the shutter 3.

The shutter side plate 32A is supported by the first side plate 22A and the shutter side plate 32B is supported by the cover 222B of the second side plate 22B, whereby the shutter 3 is supported by the housing 2.

1.2.3 Protrusions 33A and 33B

The protrusion 33A is located on the opposite side of the shutter side plate 32B with respect to the shutter side plate 32A in the first direction. The protrusion 33A extends in the first direction. The protrusion 33A extends from the shutter side plate 32A. The protrusion 33A has a columnar shape. As shown in FIG. 3, in a state where the shutter 3 is located at the closed position, the protrusion 33A is aligned with the rib 23A in the fourth direction. In a state where the shutter 3 is located at the closed position, the protrusion 33A is located between the rib 23A and the engagement portion 24A in the fourth direction.

As shown in FIG. 2, the protrusion 33B is located on the opposite side of the shutter side plate 32A with respect to the shutter side plate 32B in the first direction. The protrusion 33B extends in the first direction. The protrusion 33B extends from the shutter side plate 32B. The protrusion 33B has a columnar shape. As shown in FIG. 4, in a state where the shutter 3 is located at the closed position, the protrusion 33B is aligned with the rib 23B in the fourth direction. In a state where the shutter 3 is located at the closed position, the protrusion 33B is located between the rib 23B and the engagement portion 24B in the fourth direction.

1.3 Handle 4

As shown in FIGS. 1 and 2, the handle 4 is located at the other end of the toner cartridge 1 in the second direction. The handle 4 includes a grip 41 and two arms 42A and 42B.

The grip 41 is located between the arm 42A and the arm 42B in the first direction. The grip 41 is located away from the main body 21 of the housing 2. The grip 41 extends in the first direction. The grip 41 has a cylindrical shape. The entirety of the grip 41 is made of paper.

The arm 42A extends from the first side plate 22A. The arm 42A may be attached to the first side plate 22A. The arm 42A supports one end of the grip 41 in the first direction. The entirety of the arm 42A is made of resin. For example, the arm 42A is made of the same resin as the first side plate 22A.

The arm 42B extends from the cover 222B of the second side plate 22B. The arm 42B may be attached to the cover 222B of the second side plate 22B. The arm 42B supports the other end of the grip 41 in the first direction. The entirety of the arm 42B is made of resin. For example, the arm 42B is made of the same resin as the cover 222B of the second side plate 22B.

1.4 Agitators 5A and 5B

As shown in FIGS. 2 and 5, the agitator 5A is located in the housing 2. The agitator 5A is rotatable about the axis A1. The axis A1 extends in the first direction. The axis A1 is located away from the discharge opening 212 in the second direction. The agitator 5A rotates about the axis A1 to agitate and convey the toner in the housing 2 toward the discharge opening 212. The agitator 5A includes a shaft 51A and a plurality of blades 52A.

As shown in FIG. 2, the shaft 51A extends in the first direction along the axis A1. One end of the shaft 51A in the first direction is supported by the first side plate 22A. The other end of the shaft 51A in the first direction is supported by the support side plate 221B of the second side plate 22B. The other end of the shaft 51A in the first direction penetrates the support side plate 221B of the second side plate 22B. The entirety of the shaft 51A is made of resin.

The plurality of blades 52A are attached to the shaft 51A. The plurality of blades 52A are arranged in the first direction. The plurality of blades 52A are rotatable together with the shaft 51A. The plurality of blades 52A are made of resinous films.

The agitator 5B is located in the housing 2. The agitator 5B is located between the agitator 5A and the discharge opening 212. The agitator 5B is rotatable about the axis A2. The agitator 5B rotates about the axis A2 to agitate and convey the toner in the housing 2 toward the discharge opening 212. The agitator 5B includes a shaft 51B and a plurality of blades 52B.

The shaft 51B extends in the first direction along the axis A2. One end of the shaft 51B in the first direction is supported by the first side plate 22A. The other end of the shaft 51B in the first direction is supported by the support side plate 221B of the second side plate 22B. The other end of the shaft 51B in the first direction penetrates the support side plate 221B of the second side plate 22B. The entirety of the shaft 51B is made of resin.

The plurality of blades 52B are attached to the shaft 51B. The plurality of blades 52B are arranged in the first direction. The plurality of blades 52B are rotatable together with the shaft 51B. The plurality of blades 52B are made of resinous films.

1.5 Coupling 6

The coupling 6 is located in the second side plate 22B. The coupling 6 is located on the opposite side of the first side plate 22A with respect to the support side plate 221B in the first direction. The coupling 6 is rotatable together with the shaft 51A of the agitator 5A. The coupling 6 is attached to the other end of the shaft 51A in the first direction. The coupling 6 includes a joint 61 and a coupling gear 62. The joint 61 extends in the first direction. The joint 61 has a cylindrical shape. The coupling gear 62 is rotatable together with the joint 61. In a state where the toner cartridge 1 is attached to the process cartridge 10 and the process cartridge 10 is attached to the image forming apparatus 100, the coupling 6 rotates by power being input to the joint 61 from the image forming apparatus 100.

1.6 Gears 7A and 7B

The gear 7A is located in the second side plate 22B. The gear 7A is located on the opposite side of the first side plate 22A with respect to the support side plate 221B in the first direction. The gear 7A engages with the coupling gear 62. The gear 7A rotates by receiving power from the coupling gear 62.

The gear 7B is located in the second side plate 22B. The gear 7B is located on the opposite side of the first side plate 22A with respect to the support side plate 221B in the first direction. The gear 7B engages with the gear 7A. The gear 7B is rotatable together with the shaft 51B of the agitator 5B. The gear 7B is attached to the other end of the shaft 51B in the first direction. The gear 7B rotates by receiving power from the gear 7A.

1.7 Storage Medium 8

As shown in FIG. 3, the storage medium 8 is attached to the first side plate 22A. The storage medium 8 is an IC chip. The storage medium 8 has a flat plate shape. The storage medium 8 stores data relating to the toner cartridge 1. The data relating to the toner cartridge 1 is at least data relating to the color of developer (toner) contained in the toner cartridge 1, data relating to whether the toner cartridge 1 is a new product or a used product, or data relating to the number of sheets (or dot count) printable with the toner cartridge 1, for example.

1.8 Electrical Contact Surfaces 9

The plurality of electrical contact surfaces 9 are located on a surface of the first side plate 22A. Each of the plurality of electrical contact surfaces 9 is electrically connected to the storage medium 8. The number of the electrical contact surfaces 9 may be one.

2. Disassembly of Toner Cartridge

Figure 7:
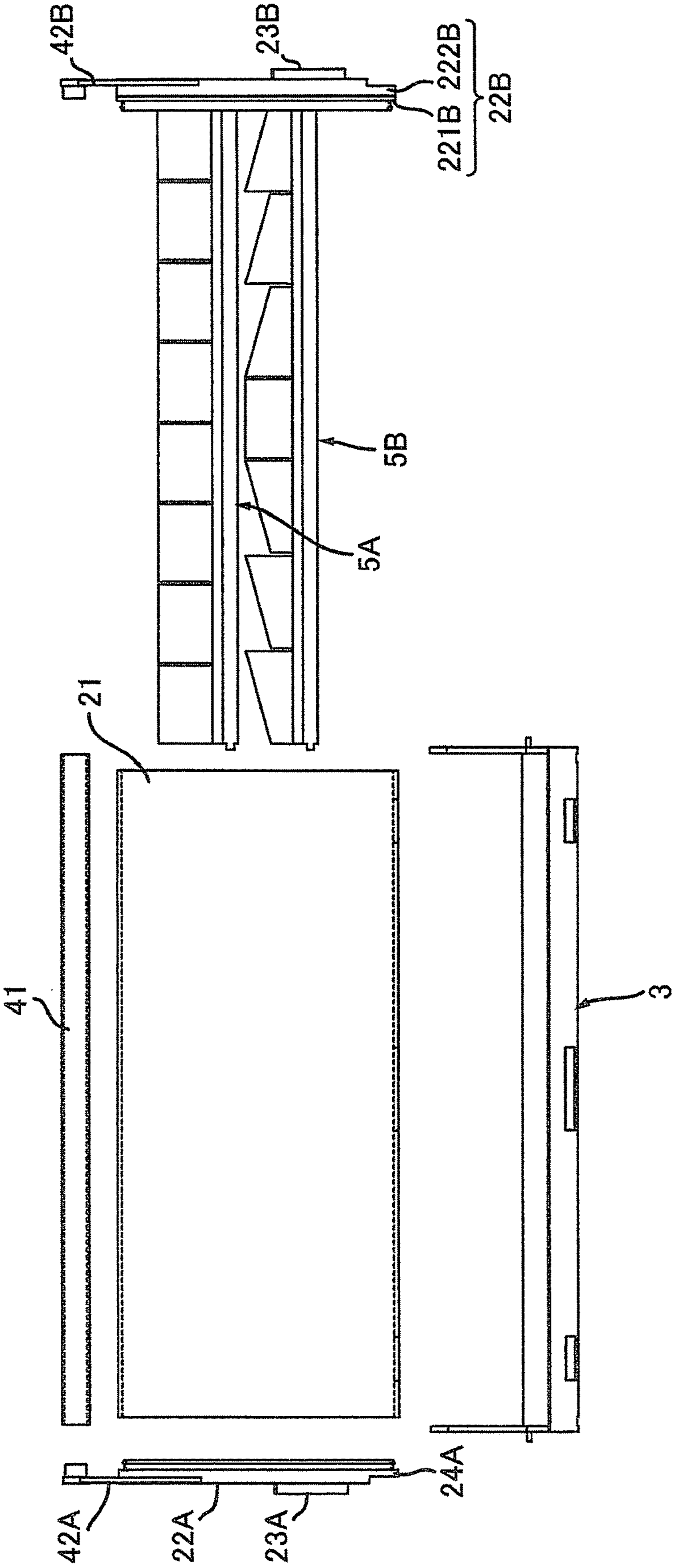
FIG. 7 is an exploded view of the toner cartridge shown in FIG. 1.

As shown in FIG. 7, the toner cartridge 1 is configured to be disassembled into a resin portion and a paper portion. The resin portion includes the shutter 3, the first side plate 22A, the second side plate 22B, the arms 42A and 42B, the ribs 23A and 23B, the engagement portions 24A and 24B (see FIG. 1), the coupling 6 (see FIG. 2), the gears 7A and 7B (see FIG. 2), and the agitators 5A and 5B. The paper portion includes the main body 21 and the grip 41.

Specifically, the shutter 3 is detachable from the housing 2 (see FIG. 1).

The first side plate 22A and the second side plate 22B are detachable from the main body 21. In a case where the arm 42A of the handle 4 (see FIG. 1), the rib 23A, and the engagement portion 24A are formed integrally with the first side plate 22A, then the arm 42A, the rib 23A, and the engagement portion 24A are detachable from the main body 21 together with the first side plate 22A. In a case where the arm 42B of the handle 4, the rib 23B, and the engagement portion 24B are formed integrally with the cover 222B of the second side plate 22B and where the coupling 6, the gears 7A and 7B, and the agitators 5A and 5B are assembled to the support side plate 221B of the second side plate 22B, then the arm 42B, the rib 23B, the engagement portion 24B, the coupling 6, the gears 7A and 7B, and the agitators 5A and 5B are detachable from the main body 21 together with the second side plate 22B.

The grip 41 of the handle 4 is also detachable from the arm 42A and the arm 42B.

This allows the resin portion and the paper portion to be separated, and the resin portion is reused and the paper portion is recycled.

As a result, the environmental load is reduced.

3. Process Cartridge 10

The process cartridge 10 will be described with reference to FIGS. 8 to 12.

In the following description of the process cartridge 10, the "first direction", the "second direction", and the "third direction" are the first direction, the second direction, and the third direction in a state where the toner cartridge 1 is attached to the process cartridge 10.

Figure 8:
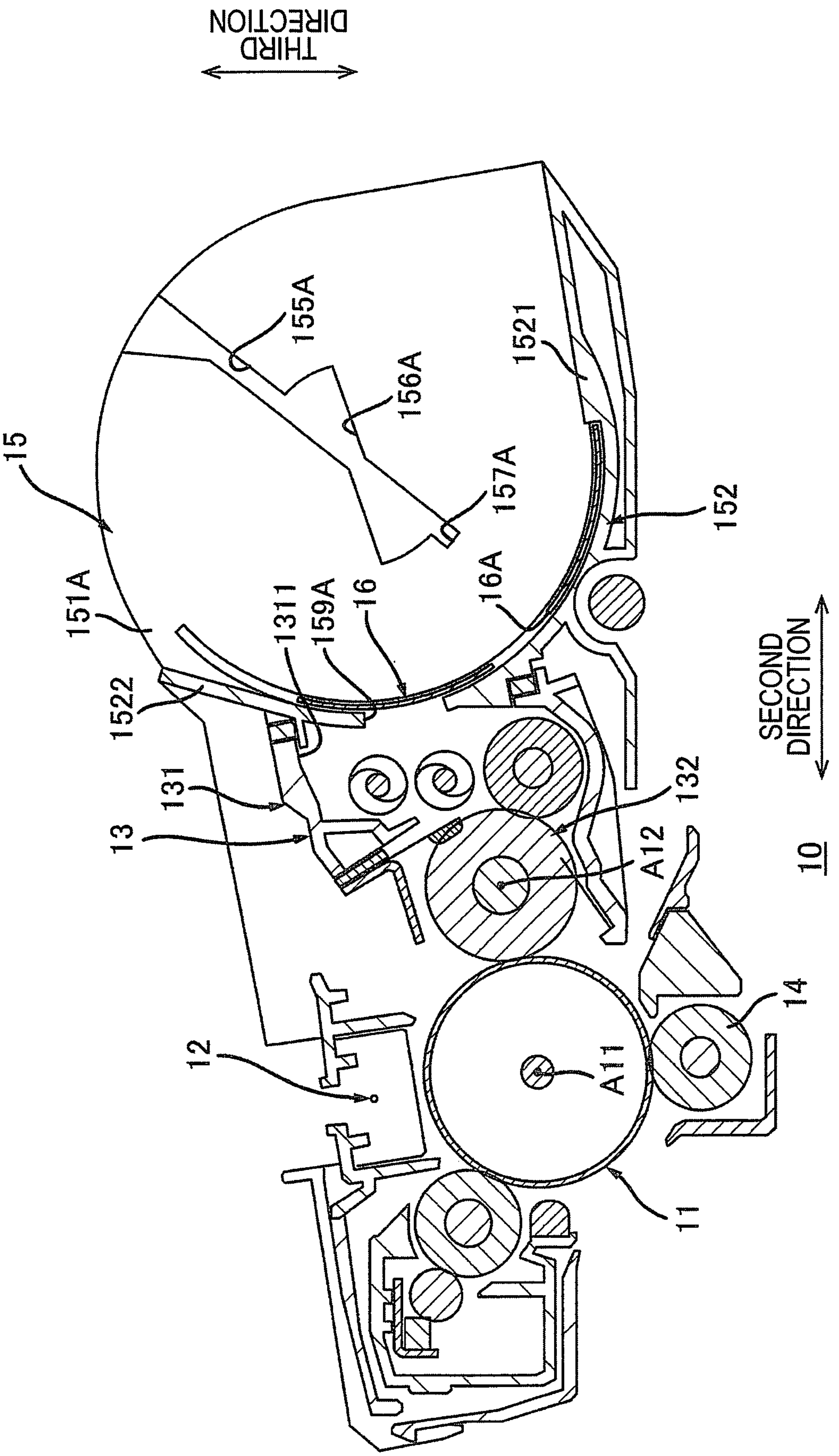
FIG. 8 is a central cross-sectional view of a process cartridge, taken along a line VIII-VIII in FIG. 9.

As shown in FIG. 8, the process cartridge 10 includes a photosensitive drum 11, a charger 12, a development unit 13, a transfer roller 14, a drum frame 15, and a process shutter 16. The process cartridge 10 is attachable to and detachable from the image forming apparatus 100 (see FIG. 13).

3.1 Photosensitive Drum 11

The photosensitive drum 11 is rotatable about a drum axis A11. The drum axis A11 extends in the first direction. The photosensitive drum 11 extends in the first direction. The photosensitive drum 11 has a cylindrical shape.

3.2 Charger 12

The charger 12 charges a circumferential surface of the photosensitive drum 11. The charger 12 is a scorotron charger.

3.3 Development Unit 13

The development unit 13 is configured to supply toner to the photosensitive drum 11. The development unit 13 includes the development housing 131 and a development roller 132. In other words, the process cartridge 10 includes the development housing 131 and the development roller 132.

The development housing 131 is configured to contain toner. The development housing 131 supports the development roller 132. The development housing 131 has a reception opening 1311. The reception opening 1311 is located at the other end of the development housing 131 in the second direction. In a state where the toner cartridge 1 is attached to the process cartridge 10, the reception opening 1311 is configured to receive the toner having passed through a passage opening 159A of the drum frame 15. The passage opening 159A will be described later.

The development roller 132 is configured to supply the toner in the development housing 131 to the photosensitive drum 11. The development roller 132 contacts the photosensitive drum 11. The development roller 132 may be separable from the photosensitive drum 11. The development roller 132 is rotatable about a development axis A12. The development axis A12 extends in the first direction. The development roller 132 extends in the first direction. The development roller 132 has a columnar shape.

3.4 Transfer Roller 14

The transfer roller 14 contacts the circumferential surface of the photosensitive drum 11. In a state where the process cartridge 10 is attached to the image forming apparatus 100, the transfer roller 14 is configured to transfer the toner from the circumferential surface of the photosensitive drum 11 to a sheet S (see FIG. 13).

3.5 Drum Frame 15

Figure 9:
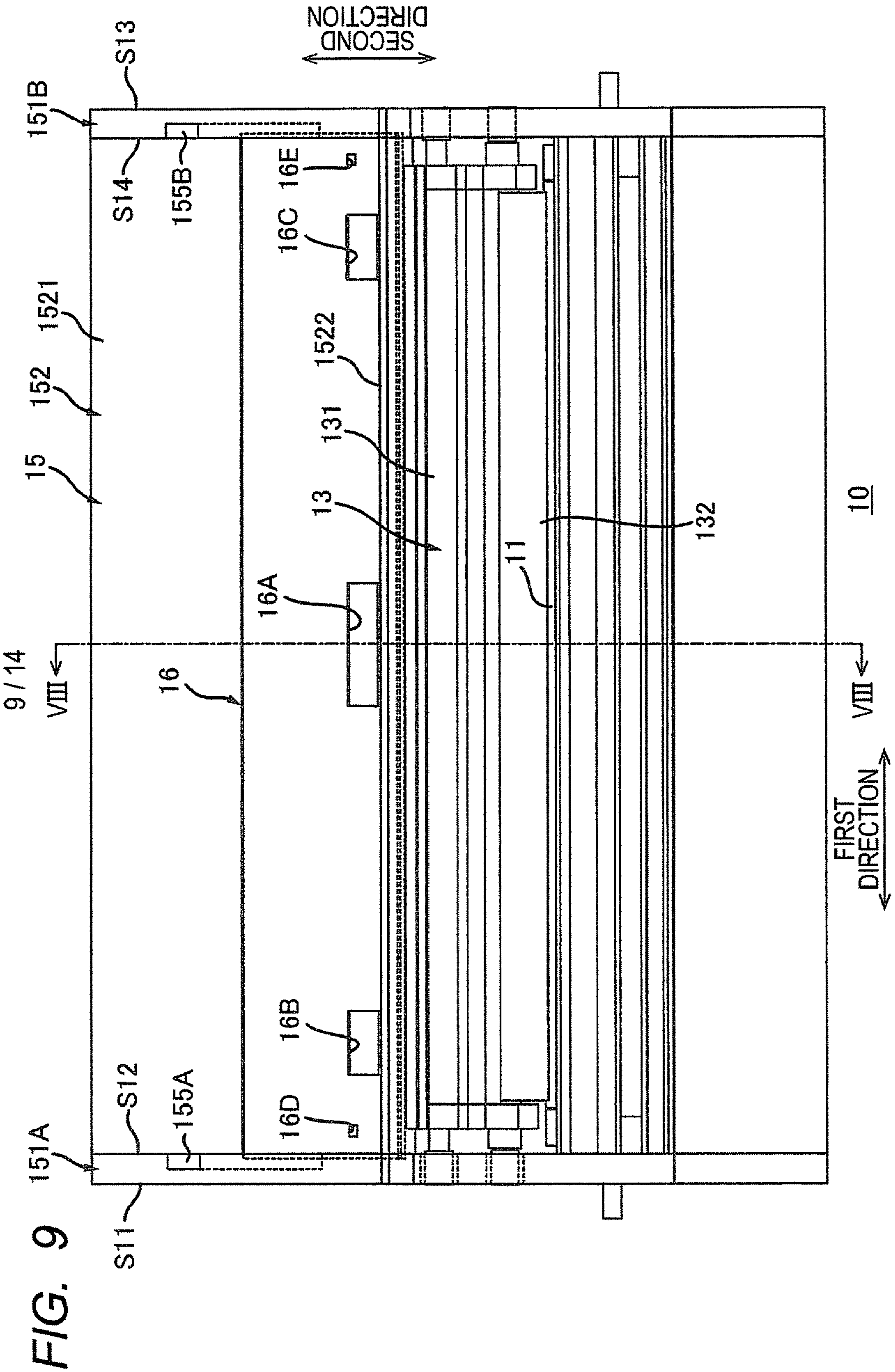
FIG. 9 is a plan view of the process cartridge shown in FIG. 8.

The drum frame 15 supports the photosensitive drum 11, the charger 12, the development unit 13, and the transfer roller 14. As shown in FIG. 9, the drum frame 15 includes a first frame 151A, a second frame 151B, and a support frame 152.

3.5.1 First Frame 151A

The first frame 151A is located at one end of the drum frame 15 in the first direction. The first frame 151A supports one end of the photosensitive drum 11 in the first direction. The first frame 151A extends in the second direction and the third direction. The first frame 151A has an outer surface S11 and an inner surface S12.

Figure 10:
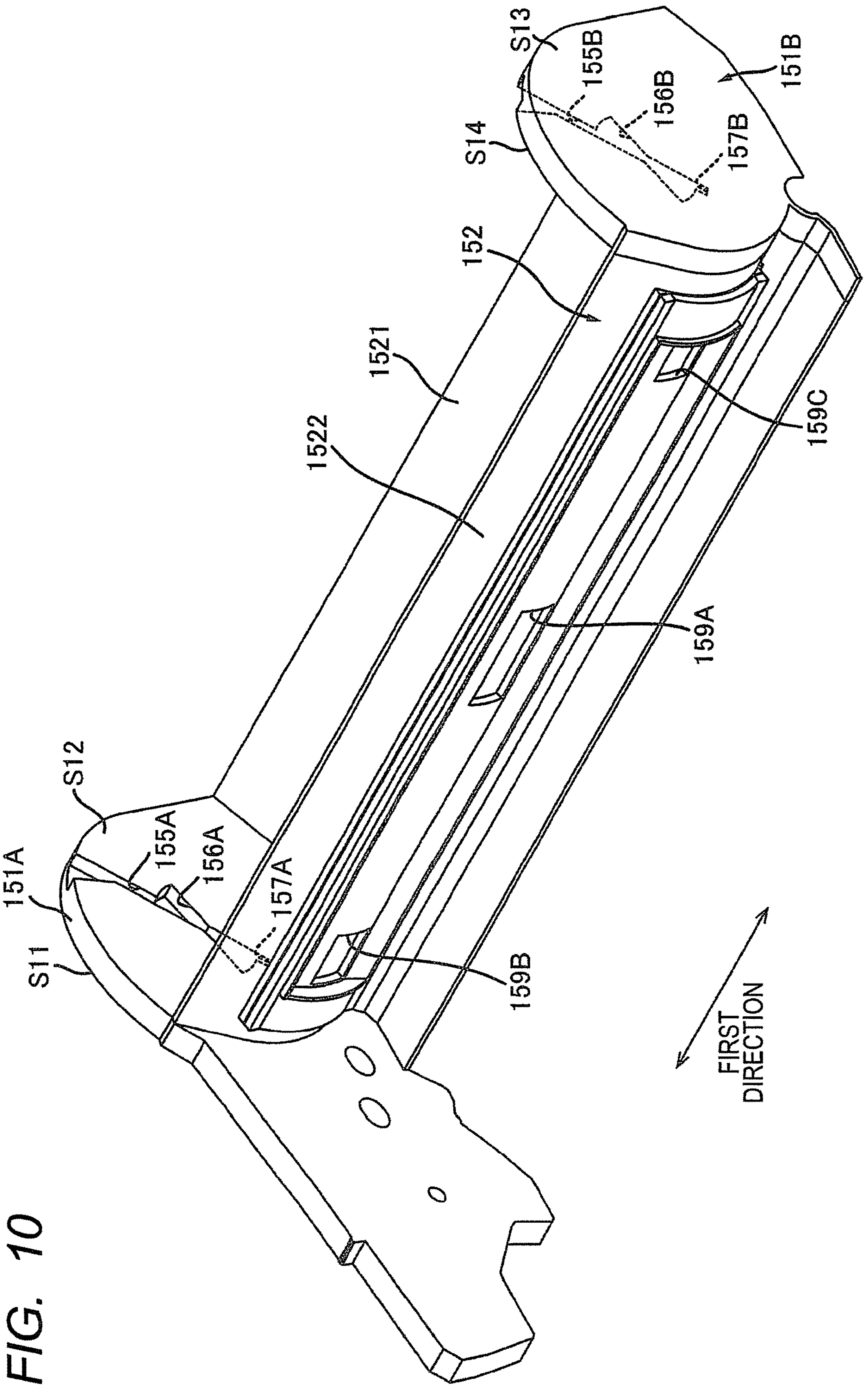
FIG. 10 is a perspective view of a part of a drum frame and a seal shown in FIG. 8.

As shown in FIG. 10, the first frame 151A includes a guide portion 155A, a lock portion 156A, and a stopper 157A.

The guide portion 155A is located at the inner surface S12 of the first frame 151A. In the present embodiment, the guide portion 155A is a groove. As shown in FIG. 8, the guide portion 155A extends in a direction crossing the first direction, the second direction, and the third direction. For example, the guide portion 155A extends in a direction perpendicular to the first direction and crossing the second direction and the third direction.

The lock portion 156A is located at the inner surface S12 of the first frame 151A. The lock portion 156A is located at one end of the guide portion 155A in a direction in which the guide portion 155A extends. In the present embodiment, the lock portion 156A is a groove. The lock portion 156A extends in a direction crossing the guide portion 155A.

The stopper 157A is located at the inner surface S12 of the first frame 151A. The stopper 157A is located between the guide portion 155A and the support frame 152 in the direction in which the guide portion 155A extends. The stopper 157A is connected to the guide portion 155A. In the present embodiment, the stopper 157A is a groove. In a state where the toner cartridge 1 (see FIG. 1) is supported by the support frame 152, the protrusion 33A (see FIG. 2) of the toner cartridge 1 fits into the stopper 157A.

3.5.2 Second Frame 151B

As shown in FIG. 9, the second frame 151B is located at the other end of the drum frame 15 in the first direction. The second frame 151B is located away from the first frame 151A in the first direction. The second frame 151B supports the other end of the photosensitive drum 11 in the first direction. The first frame 151A supports one end of the photosensitive drum 11 in the first direction, and the second frame 151B supports the other end of the photosensitive drum 11 in the first direction, whereby the drum frame 15 supports the photosensitive drum 11. The second frame 151B extends in the second direction and the third direction. The second frame 151B has an outer surface S13 and an inner surface S14.

As shown in FIG. 10, the second frame 151B includes a guide portion 155B, a lock portion 156B and a stopper 157B.

The guide portion 155B is located at the inner surface S14 of the second frame 151B. In the present embodiment, the guide portion 155B is a groove. In the present embodiment, the guide portion 155B extends in the same direction as the guide portion 155A.

The lock portion 156B is located at the inner surface S14 of the second frame 151B. The lock portion 156B is located at one end of the guide portion 155B in the direction in which the guide portion 155B extends. In the present embodiment, the lock portion 156B is a groove. The lock portion 156B extends in a direction crossing the guide portion 155B. In the present embodiment, the lock portion 156B extends in the same direction as the lock portion 156A.

The stopper 157B is located at the inner surface S14 of the second frame 151B. The stopper 157B is located between the guide portion 155B and the support frame 152 in the direction in which the guide portion 155B extends. The stopper 157B is connected to the guide portion 155B. In the present embodiment, the stopper 157B is a groove. In a state where the toner cartridge 1 (see FIG. 1) is supported by the support frame 152, the protrusion 33B (see FIG. 1) of the toner cartridge 1 fits into the stopper 157B.

3.5.3 Support Frame 152

As shown in FIG. 8, the support frame 152 is located on the opposite side of the photosensitive drum 11 with respect to the development unit 13 in the second direction. The support frame 152 is configured to support the toner cartridge 1 (see FIG. 12).

As shown in FIG. 9, the support frame 152 is located between the first frame 151A and the second frame 151B in the first direction. The support frame 152 extends in the first direction. One end of the support frame 152 in the first direction is connected to the first frame 151A. The other end of the support frame 152 in the first direction is connected to the second frame 151B.

As shown in FIGS. 8 and 10, the support frame 152 includes a support portion 1521 and a partition portion 1522.

3.5.3.1 Support Portion 1521

The support portion 1521 extends in the first direction and the second direction. The support portion 1521 is located between the first frame 151A and the second frame 151B in the first direction. One end of the support portion 1521 in the first direction is connected to the first frame 151A. The other end of the support portion 1521 in the first direction is connected to the second frame 151B.

3.5.3.2 Partition Portion 1522

As shown in FIG. 8, the partition portion 1522 is located between the support portion 1521 and the development housing 131 in the second direction. In a state where the toner cartridge 1 is attached to the process cartridge 10, the partition portion 1522 partitions the toner cartridge 1 (see FIG. 12) and the development housing 131. The partition portion 1522 extends from the support portion 1521 in the third direction.

As shown in FIG. 10, the partition portion 1522 is located between the first frame 151A and the second frame 151B in the first direction. The partition portion 1522 extends in the first direction. One end of the partition portion 1522 in the first direction is connected to the first frame 151A. The other end of the partition portion 1522 in the first direction is connected to the second frame 151B. The partition portion 1522 has the passage opening 159A and two second passage openings 159B and 159C. That is, the support frame 152 has the passage opening 159A.

The passage opening 159A is located at a central portion of the partition portion 1522 in the first direction. The passage opening 159A communicates with the reception opening 1311 (see FIG. 8) of the development housing 131. In a state where the toner cartridge 1 is supported by the support frame 152, the toner supplied from the toner cartridge 1 to the development housing 131 passes through the passage opening 159A.

The second passage opening 159B is located away from the passage opening 159A in the first direction. The second passage opening 159B is located between the passage opening 159A and the first frame 151A in the first direction. The second passage opening 159B communicates with the reception opening 1311 (see FIG. 8) of the development housing 131, like the passage opening 159A. In a state where the toner cartridge 1 (see FIG. 12) is supported by the support frame 152, return toner that returns from the development housing 131 to the toner cartridge 1 passes through the second passage opening 159B.

The second passage opening 159C is located on the opposite side of the second passage opening 159B with respect to the passage opening 159A in the first direction. The second passage opening 159C is located away from the passage opening 159A in the first direction. The second passage opening 159C is located between the passage opening 159A and the second frame 151B in the first direction. The second passage opening 159C communicates with the reception opening 1311 (see FIG. 8) of the development housing 131, like the passage opening 159A and the second passage opening 159B. In a state where the toner cartridge 1 (see FIG. 12) is supported by the support frame 152, return toner that returns from the development housing 131 to the toner cartridge 1 passes through the second passage opening 159C.

3.6 Process Shutter 16

Figure 11:
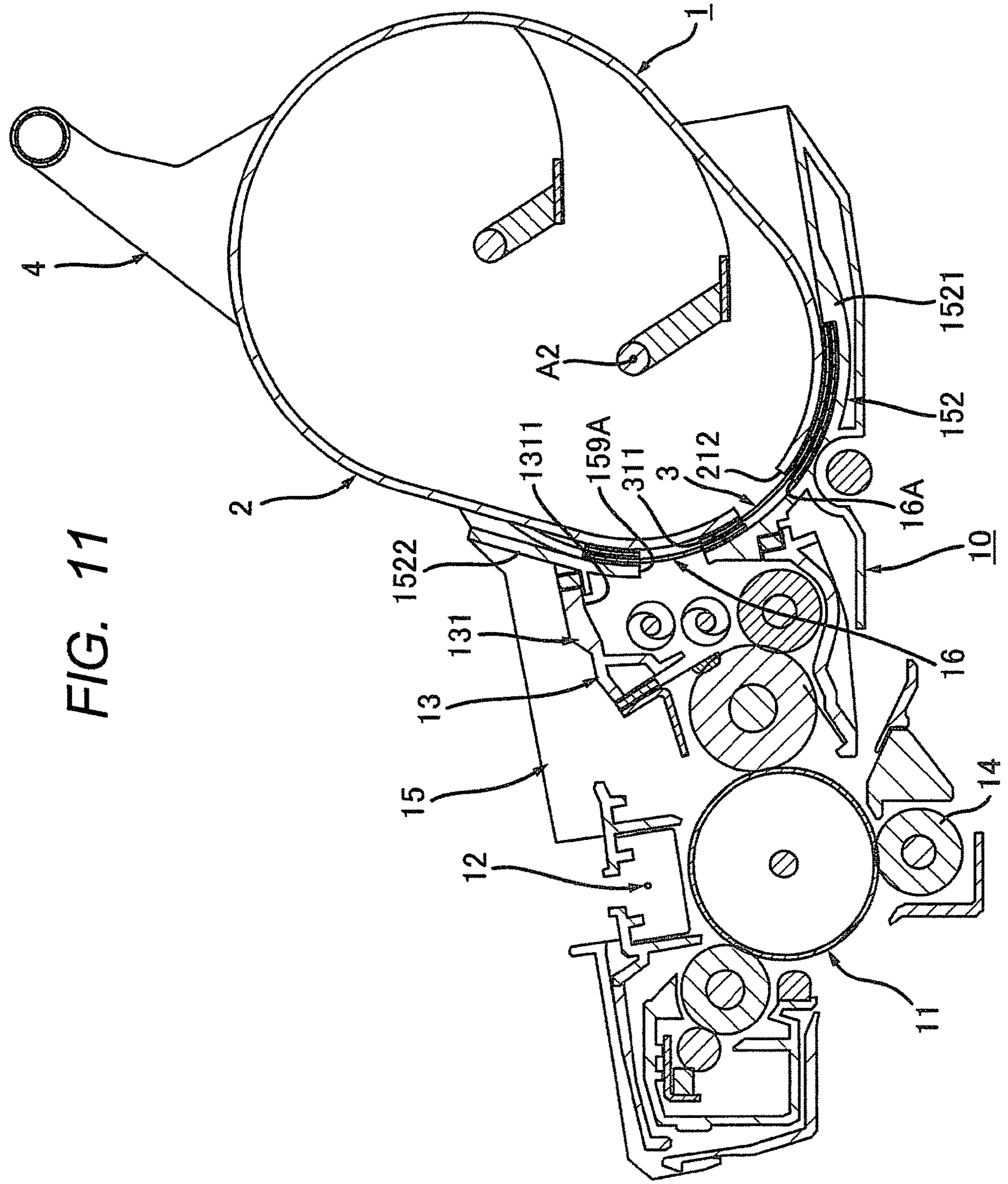
FIG. 11 is an explanatory diagram for explaining attaching of the toner cartridge to the process cartridge, and shows a state where the toner cartridge is inserted into a support frame, a shutter of the toner cartridge is located at a closed position, and a process shutter of the process cartridge is located at a closed position.
Figure 12:
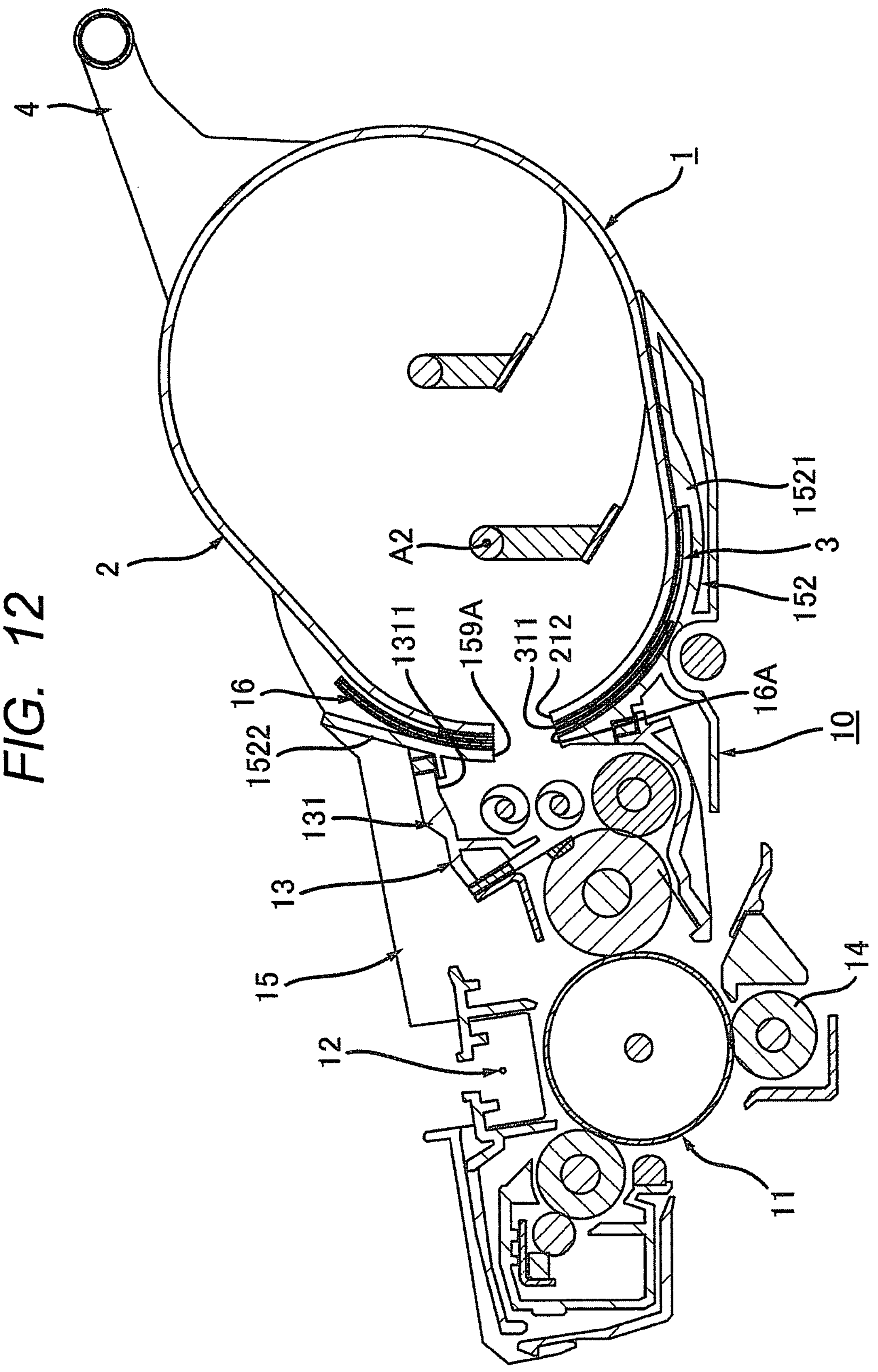
FIG. 12 is an explanatory diagram for explaining the attaching of the toner cartridge to the process cartridge following FIG. 11, and shows a state where a housing of the toner cartridge is rotated, the shutter of the toner cartridge is located at an open position, and the process shutter of the process cartridge is located at an open position.

As shown in FIGS. 11 and 12, the process shutter 16 is configured to open and close the passage opening 159A and the second passage openings 159B and 159C (see FIG. 10). Specifically, the process shutter 16 is movable between a closed position (see FIG. 11) at which the process shutter 16 closes the passage opening 159A and the second passage openings 159B and 159C and an open position (see FIG. 12) at which the passage opening 159A and the second passage openings 159B and 159C are open.

As shown in FIG. 9, the process shutter 16 extends in the first direction. The process shutter 16 has a shutter opening 16A, two second shutter openings 16B and 16C, and engagement holes 16D and 16E.

The shutter opening 16A is located at a central portion of the process shutter 16 in the first direction. As shown in FIG. 11, in a state where the process shutter 16 is located at the closed position, the shutter opening 16A is located away from the passage opening 159A. In a state where the process shutter 16 is located at the closed position, the shutter opening 16A does not communicate with the passage opening 159A. Thus, the process shutter 16 closes the passage opening 159A. As shown in FIG. 12, in a state where the process shutter 16 is located at the open position, the shutter opening 16A communicates with the passage opening 159A. Thus, the passage opening 159A is opened.

As shown in FIG. 9, the second shutter opening 16B is located away from the shutter opening 16A in the first direction. The second shutter opening 16B is located between the shutter opening 16A and the first frame 151A in the first direction. In a state where the process shutter 16 is located at the closed position (see FIG. 11), the second shutter opening 16B is located away from the second passage opening 159B (see FIG. 10). In a state where the process shutter 16 is located at the closed position, the second shutter opening 16B does not communicate with the second passage opening 159B. Thus, the process shutter 16 closes the second passage opening 159B. In a state where the process shutter 16 is located at the open position (see FIG. 12), the second shutter opening 16B communicates with the second passage opening 159B. Thus, the second passage opening 159B is opened.

The second shutter opening 16C is located on the opposite side of the second shutter opening 16B with respect to the shutter opening 16A in the first direction. The second shutter opening 16C is located away from the shutter opening 16A in the first direction. The second shutter opening 16C is located between the shutter opening 16A and the second frame 151B in the first direction. In a state where the process shutter 16 is located at the closed position (see FIG. 11), the second shutter opening 16C is located away from the second passage opening 159C (see FIG. 10). In a state where the process shutter 16 is located at the closed position, the second shutter opening 16C does not communicate with the second passage opening 159C. Thus, the process shutter 16 closes the second passage opening 159C. In a state where the process shutter 16 is located at the open position (see FIG. 12), the second shutter opening 16C communicates with the second passage opening 159C. Thus, the second passage opening 159C is opened.

The engagement hole 16D is located at one end of the process shutter 16 in the first direction. The engagement hole 16D is located between the first frame 151A and the second shutter opening 16B in the first direction. The engagement hole 16D is located away from the second shutter opening 16B in the first direction.

The engagement hole 16E is located at the other end of the process shutter 16 in the first direction. The engagement hole 16E is located between the second frame 151B and the second shutter opening 16C in the first direction. The engagement hole 16E is located away from the second shutter opening 16C in the first direction.

3.7 Operation of Attaching and Detaching Toner Cartridge 1 to and from Process Cartridge 10

In order to attach the toner cartridge 1 to the process cartridge 10, as shown in FIG. 11, the operator inserts the toner cartridge 1 into the support frame 152 of the process cartridge 10 in a state where the shutter 3 is located at the closed position.

Then, the rib 23A (see FIG. 3) of the toner cartridge 1 fits into the guide portion 155A (see FIG. 10) of the process cartridge 10. The rib 23B (see FIG. 1) of the toner cartridge 1 fits into the guide portion 155B (see FIG. 10) of the process cartridge 10.

Further, the protrusion 33A (see FIG. 3) of the toner cartridge 1 fits into the stopper 157A (see FIG. 10) of the process cartridge 10. The protrusion 33B (see FIG. 1) of the toner cartridge 1 fits into the stopper 157B (see FIG. 10) of the process cartridge 10. The protrusion 33A fits into the stopper 157A, and the protrusion 33B fits into the stopper 157B, whereby the shutter 3 is fixed to the process cartridge 10.

The engagement portion 24A (see FIG. 1) of the toner cartridge 1 fits into the engagement hole 16D (see FIG. 9) of the process shutter 16. That is, in a state where the toner cartridge 1 is supported by the support frame 152, the engagement portion 24A is engageable with the process shutter 16. The engagement portion 24B (see FIG. 1) of the toner cartridge 1 fits into the engagement hole 16E (see FIG. 10) of the process shutter 16. The engagement portion 24A fits into the engagement hole 16D, and the engagement portion 24B fits into the engagement hole 16E, whereby the process shutter 16 is movable together with the housing 2 of the toner cartridge 1.

Next, as shown in FIGS. 11 and 12, the operator rotates the housing 2 of the toner cartridge 1 about the axis A2.

Then, the housing 2 rotates in a state where the shutter 3 is fixed to the process cartridge 10, which causes the shutter 3 to move from the closed position to the open position relative to the housing 2. Further, the process shutter 16 moves together with the housing 2, which causes the process shutter 16 to move from the closed position to the open position relative to the support frame 152.

As shown in FIG. 12, when the toner cartridge 1 is completely attached to the process cartridge 10, the shutter 3 is located at the open position, and the process shutter 16 is located at the open position.

Further, the rib 23A (see FIG. 3) of the toner cartridge 1 fits into the lock portion 156A (see FIG. 10) of the process cartridge 10. The rib 23B (see FIG. 1) of the toner cartridge 1 fits into the lock portion 156B (see FIG. 10) of the process cartridge 10. The rib 23A fits into the lock portion 156A, and the rib 23B fits into the lock portion 156B, whereby the toner cartridge 1 is locked to the process cartridge 10.

In order to detach the toner cartridge 1 from the process cartridge 10, as shown in FIGS. 12 and 11, the operator first rotates the housing 2 of the toner cartridge 1 in a direction opposite to the direction in which the toner cartridge 1 is attached to the process cartridge 10.

Then, the housing 2 rotates in a state where the shutter 3 is fixed to the process cartridge 10, which causes the shutter 3 to move from the open position to the closed position relative to the housing 2. Further, the process shutter 16 moves together with the housing 2, which causes the process shutter 16 to move from the open position to the closed position relative to the support frame 152.

Then, as shown in FIG. 11, in a state where the shutter 3 is located at the closed position and the process shutter 16 is located at the closed position, the rib 23A is disengaged from the lock portion 156A, and the rib 23B is disengaged from the lock portion 156B. Thereby, lock of the toner cartridge 1 relative to the process cartridge 10 is released.

Thereafter, the operator detaches the toner cartridge 1 from the support frame 152 of the process cartridge 10.

4. Image Forming Apparatus

Next, the image forming apparatus 100 will be described with reference to FIGS. 13 and 14.

The image forming apparatus 100 includes a main housing 101, a cover 102, a sheet storage portion 103, the process cartridge 10, the toner cartridge 1, an exposure device 104, and a fuser (fixing device) 105.

4.1 Main Housing 101

The main housing 101 accommodates the sheet storage portion 103, the process cartridge 10, the toner cartridge 1, the exposure device 104, and the fuser 105. The main housing 101 has an opening 101A (see FIG. 14).

4.2 Cover 102

Figure 13:
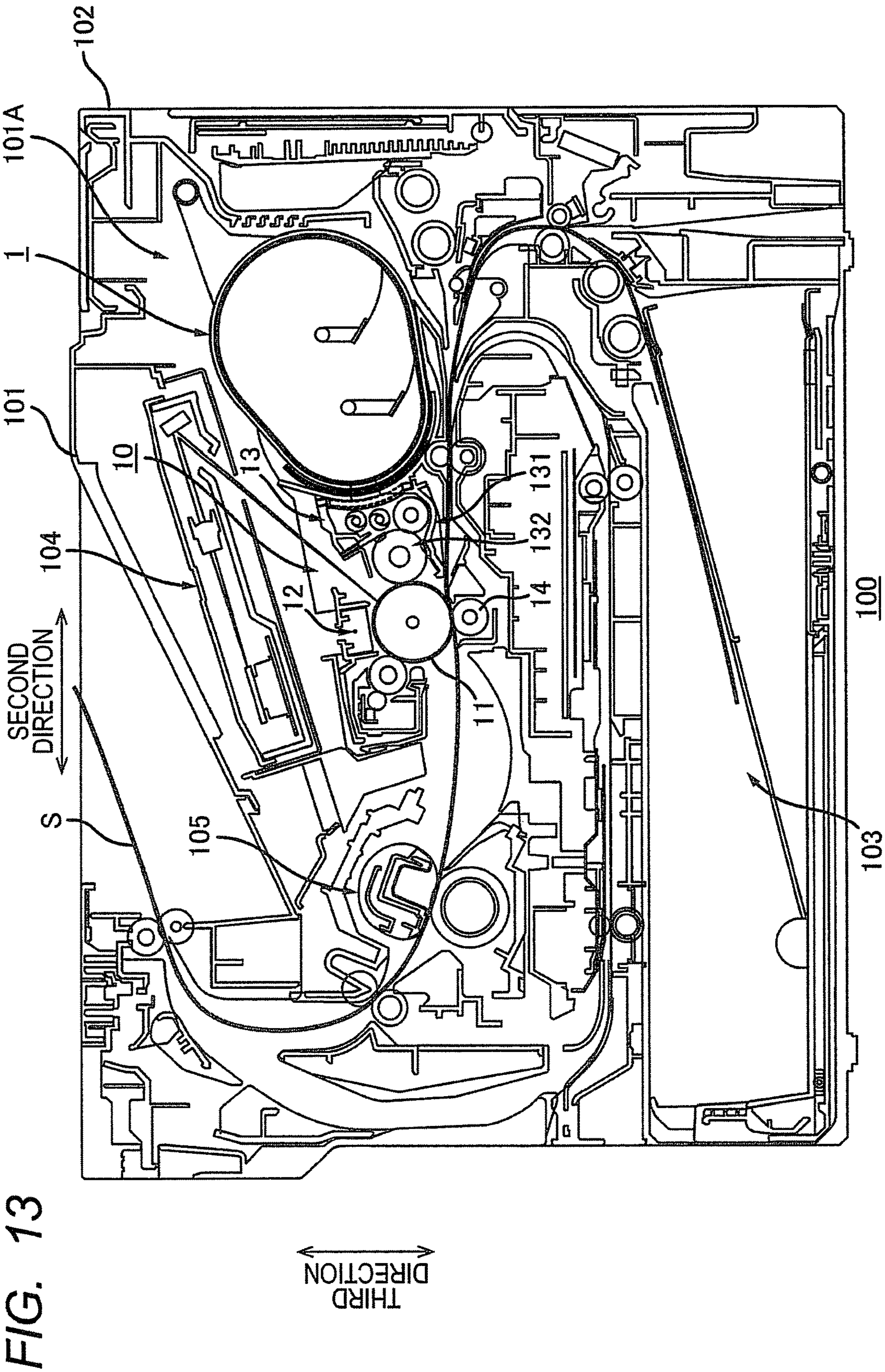
FIG. 13 is a schematic configuration diagram of an image forming apparatus.
Figure 14:
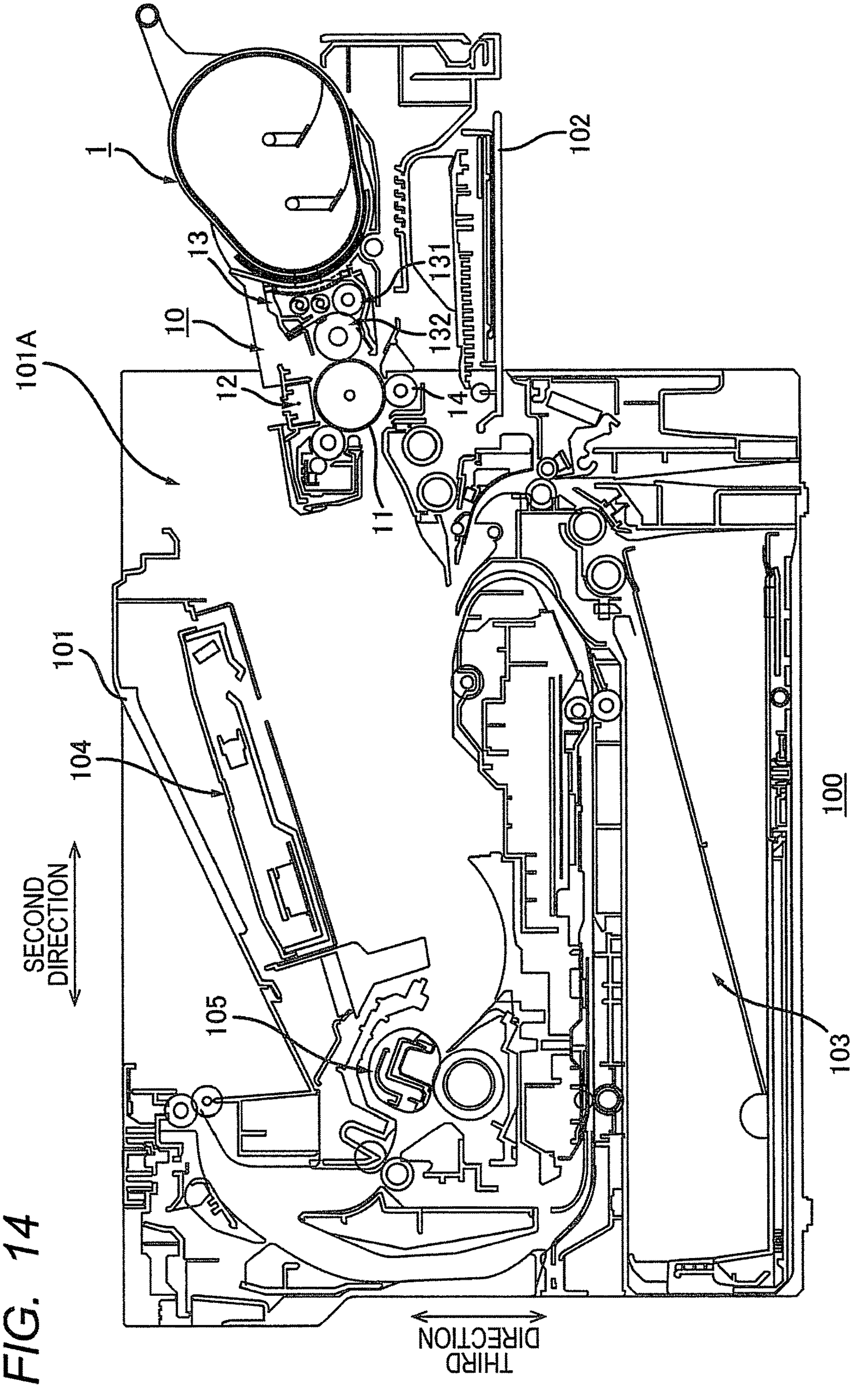
FIG. 14 shows a state where the process cartridge shown in FIG. 13 is detached from the image forming apparatus.

The cover 102 is movable between a cover closed position (see FIG. 13) and a cover open position (see FIG. 14). As shown in FIG. 13, in a state where the cover 102 is located at the cover closed position, the cover 102 closes the opening 101A. As shown in FIG. 14, the opening 101A is opened in a state where the cover 102 is located at the cover open position. In a state where the cover 102 is located at the cover open position, the process cartridge 10 is attachable to and detachable from the image forming apparatus 100 through the opening 101A.

4.3 Sheet Storage Portion 103

As shown in FIG. 13, the sheet storage portion 103 is configured to store the sheet S. The sheet S in the sheet storage portion 103 is conveyed toward the transfer roller 14. The sheet S from the sheet storage portion 103 passes between the transfer roller 14 and the photosensitive drum 11. At this time, the toner on the photosensitive drum 11 is transferred onto the sheet S by the transfer roller 14.

4.4 Exposure Device 104

The exposure device 104 is configured to expose the photosensitive drum 11. Specifically, in a state where the process cartridge 10 is attached to the image forming apparatus 100, the exposure device 104 exposes the surface of the photosensitive drum 11 charged by the charger 12. The development roller 132 supplies toner to the exposed surface of the photosensitive drum 11. In the present embodiment, the exposure device 104 is a laser scan unit. The exposure device 104 may be an LED head.

4.5 Fuser 105

The fuser 105 is located away from the cover 102 in the second direction. The fuser 105 fixes the toner transferred to the sheet S to the sheet S. In the present embodiment, the fuser 105 fixes the toner to the sheet S by heating and pressurizing the sheet S to which the toner has been transferred. The sheet S that has passed through the fuser 105 is discharged onto an upper surface of the main housing 101.

5. Operations and Effects (1) According to the toner cartridge 1, as shown in FIG. 1, at least the main body 21 of the housing 2 of the toner cartridge 1 is made of paper.

This suppresses the disposal of resin which may increase the environmental load.

As a result, the environmental load is reduced.

As shown in FIG. 7, the first side plate 22A and the second side plate 22B made of resin and the main body 21 made of paper are separated, and the resin portion is reused while the paper portion is recycled, whereby the environmental load is further reduced.

(2) According to the toner cartridge 1, as shown in FIG. 2, the first side plate 22A supports one end of the agitator 5A in the first direction. The second side plate 22B supports the other end of the agitator 5A in the first direction.

Thus, the agitator 5A is stably supported by the first side plate 22A and second side plate 22B made of resin while reducing the environmental load by the main body 21 made of paper.

(3) According to the toner cartridge 1, as shown in FIGS. 1 and 2, the first side plate 22A and the second side plate 22B support the shutter 3.

Thus, the shutter 3 is stably supported by the first side plate 22A and the second side plate 22B made of resin while reducing the environmental load by the main body 21 made of paper.

(4) According to the toner cartridge 1, as shown in FIG. 2, the one end E1 of the main body 21 in the first direction has the first opening 211A, and the other end E2 of the main body 21 in the first direction has the second opening 211B.

Thus, the main body 21 is easily manufactured by simply forming paper into a tubular shape with both ends in the first direction being open.

(5) According to the toner cartridge 1, as shown in FIG. 1, the handle 4 includes the grip 41 made of paper and the arms 42A and 42B made of resin.

Thus, not only the main body 21 but also the grip 41 of the handle 4 is manufactured from paper, which further reduces the environmental load.

(6) According to the toner cartridge 1, as shown in FIG. 3, the electrical contact surfaces 9 are located on the surface of the first side plate 22A.

Thus, the electrical contact surfaces 9 are stably supported by the first side plate 22A made of resin while reducing the environmental load by the main body 21 made of paper.

(7) According to the toner cartridge 1, as shown in FIG. 1, the first side plate 22A includes the engagement portion 24A, and the second side plate 22B includes the engagement portion 24B.

As shown in FIG. 11, in a state where the toner cartridge 1 is supported by the support frame 152, the engagement portion 24A engages with the engagement hole 16D (see FIG. 9) of the process shutter 16, and the engagement portion 24B engages with the engagement hole 16E (see FIG. 9) of the process shutter 16.

Thus, the process shutter 16 is movable together with the housing 2 in a state where the toner cartridge 1 is supported by the support frame 152.

As shown in FIGS. 11 and 12, by rotating the housing 2, the process shutter 16 is moved from the closed position (see FIG. 11) to the open position (see FIG. 12).

As a result, while reducing the environmental load by the main body 21 made of paper, the process shutter 16 is smoothly opened and closed by using the engagement portion 24A provided on the first side plate 22A made of resin and the engagement portion 24B provided on the second side plate 22B made of resin.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided as appropriate.

What is claimed is:

1. A toner cartridge comprising:

a housing configured to contain toner, the housing including:

a main body having a tubular shape extending in a first direction, the main body being made of paper;

a first side plate located at one end of the main body in the first direction, the first side plate being made of resin; and a second side plate located at an other end of the main body in the first direction, the second side plate being made of resin, the main body including a peripheral surface having a discharge opening, the discharge opening being configured to discharge toner in the housing, wherein the one end of the main body in the first direction has a first opening;

wherein the other end of the main body in the first direction has a second opening;

wherein the first side plate closes the first opening; and wherein the second side plate closes the second opening.

2. The toner cartridge according to claim 1, further comprising:

an agitator located in the housing, the agitator being rotatable about an axis extending in the first direction to agitate toner in the housing, wherein the first side plate supports one end of the agitator in the first direction; and wherein the second side plate supports an other end of the agitator in the first direction.

3. The toner cartridge according to claim 2, further comprising:

a coupling located at the second side plate, the coupling being attached to the other end of the agitator in the first direction, the coupling being rotatable together with the agitator, the coupling being configured to rotate by power that is input from an image forming apparatus.

4. The toner cartridge according to claim 3, further comprising:

a second agitator located in the housing, the second agitator being rotatable about an axis extending in the first direction to agitate toner in the housing, the first side plate supporting one end of the second agitator in the first direction, the second side plate supporting an other end of the second agitator in the first direction;

a first gear located at the second side plate, the first gear engaging with a coupling gear of the coupling; and a second gear located at the second side plate, the second gear engaging with the first gear, the second gear being attached to the other end of the second agitator in the first direction, the second gear being rotatable together with the second agitator.

5. The toner cartridge according to claim 1, further comprising:

a shutter configured to open and close the discharge opening, wherein at least the first side plate or the second side plate supports the shutter.

6. The toner cartridge according to claim 1, further comprising a handle, wherein the handle includes:

a grip extending in the first direction, the grip being made of paper; and an arm extending from the first side plate and supporting the grip, the arm being made of resin.

7. The toner cartridge according to claim 6, wherein the toner cartridge is attachable to and detachable from a process cartridge, the process cartridge including a guide portion and a process shutter, the guide portion being configured to guide the toner cartridge when the toner cartridge is attached to the process cartridge, the process shutter being configured to open and close a passage opening of the process cartridge, the passage opening being an opening through which toner from the toner cartridge passes;

wherein the first side plate includes:

a rib configured to fit into the guide portion when the toner cartridge is attached to the process cartridge; and an engagement portion configured to engage with the process shutter when the toner cartridge is attached to the process cartridge;

wherein the arm of the handle, the rib, and the engagement portion are formed integrally with the first side plate;

wherein the arm, the rib, and the engagement portion are detachable from the main body together with the first side plate; and wherein the grip of the handle is detachable from the arm.

8. The toner cartridge according to claim 1, further comprising:

a storage medium; and an electrical contact surface electrically connected to the storage medium, the electrical contact surface being located on a surface of the first side plate.

9. The toner cartridge according to claim 1, wherein the toner cartridge is attachable to and detachable from a process cartridge;

wherein the process cartridge includes:

a photosensitive drum;

a support frame configured to support the toner cartridge, the support frame having a passage opening through which toner from the toner cartridge passes in a state where the toner cartridge is supported by the support frame;

a process shutter configured to open and close the passage opening;

a development housing having a reception opening configured to receive toner that has passed through the passage opening; and a development roller configured to supply toner in the development housing to the photosensitive drum; and wherein at least the first side plate or the second side plate includes an engagement portion configured to engage with the process shutter in a state where the toner cartridge is supported by the support frame.

10. A toner cartridge comprising:

a housing configured to contain toner, the housing having a discharge opening configured to discharge toner; and an agitator located in the housing, the agitator being rotatable about an axis extending in a first direction to agitate toner in the housing, the housing including:

a main body having a tubular shape extending in the first direction, the main body being made of paper;

a first side plate located at one end of the main body in the first direction, the first side plate being made of resin; and a second side plate located at an other end of the main body in the first direction, the second side plate being made of resin, the first side plate supporting one end of the agitator in the first direction, and the second side plate supporting an other end of the agitator in the first direction, wherein the one end of the main body in the first direction has a first opening;

wherein the other end of the main body in the first direction has a second opening;

wherein the first side plate closes the first opening; and
wherein the second side plate closes the second opening.

11. The toner cartridge according to claim 10, further comprising:

a shutter configured to open and close the discharge opening, wherein at least the first side plate or the second side plate supports the shutter.

12. The toner cartridge according to claim 10, further comprising a handle, wherein the handle includes:

a grip extending in the first direction, the grip being made of paper; and an arm extending from the first side plate and supporting the grip, the arm being made of resin.

13. The toner cartridge according to claim 10, further comprising:

a storage medium; and an electrical contact surface electrically connected to the storage medium, the electrical contact surface being located on a surface of the first side plate.

14. The toner cartridge according to claim 10, wherein the toner cartridge is attachable to and detachable from a process cartridge;

wherein the process cartridge includes:

a photosensitive drum;

a support frame configured to support the toner cartridge, the support frame having a passage opening through which toner from the toner cartridge passes in a state where the toner cartridge is supported by the support frame;

a process shutter configured to open and close the passage opening;

a development housing having a reception opening configured to receive toner that has passed through the passage opening; and a development roller configured to supply toner in the development housing to the photosensitive drum; and wherein at least the first side plate or the second side plate includes an engagement portion configured to engage with the process shutter in a state where the toner cartridge is supported by the support frame.

15. A toner cartridge comprising:

a housing configured to contain toner, the housing including:

a main body having a tubular shape extending in a first direction, the main body being made of paper;

a first side plate located at one end of the main body in the first direction, the first side plate being made of resin; and a second side plate located at an other end of the main body in the first direction, the second side plate being made of resin, the housing having a discharge opening, the discharge opening being configured to discharge toner in the housing, wherein the one end of the main body in the first direction has a first opening;

wherein the other end of the main body in the first direction has a second opening;

wherein the first side plate closes the first opening; and wherein the second side plate closes the second opening.

* * * * *